(12) United States Patent
Ito et al.

(10) Patent No.: US 8,305,729 B2
(45) Date of Patent: Nov. 6, 2012

(54) LAMINATED CERAMIC ELECTRONIC COMPONENT

(75) Inventors: Tsuyoshi Ito, Echizen (JP); Takehisa Sasabayashi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 486 days.

(21) Appl. No.: 12/489,631

(22) Filed: Jun. 23, 2009

(65) Prior Publication Data

US 2010/0008017 A1  Jan. 14, 2010

(30) Foreign Application Priority Data

Jul. 10, 2008 (JP) ................. 2008-180568
May 1, 2009 (JP) ................. 2009-112175

(51) Int. Cl.
*H01G 4/005* (2006.01)
*H01G 4/228* (2006.01)

(52) U.S. Cl. ...................... 361/303; 361/309
(58) Field of Classification Search .......... 361/303, 361/308.1, 309
See application file for complete search history.

(56) References Cited

U.S. PATENT DOCUMENTS

| | | | |
|---|---|---|---|
| 4,584,628 A * | 4/1986 | Cichanowski | 361/309 |
| 6,577,491 B1 * | 6/2003 | Ohtsuka et al. | 361/306.3 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,329,976 B2 | 2/2008 | Shirasu et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2006/0245141 A1 | 11/2006 | Shirasu et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

JP       63146421 A   *   6/1988

(Continued)

OTHER PUBLICATIONS

Kunishi et al.: "Laminated Electronic Component and Method for Manufacturing the Same"; U.S. Appl. No. 12/030,360, filed Feb. 13, 2008.

(Continued)

*Primary Examiner* — Eric Thomas
(74) *Attorney, Agent, or Firm* — Keating & Bennett, LLP

(57) ABSTRACT

A laminated ceramic electronic component includes first internal electrodes and second internal electrodes that overlap each other through ceramic layers, each of the first and second internal electrodes having first and second effective portions, first and second connecting portions, and first and second extended portions whose film thickness is greater than that of the first and second connecting portions and which are exposed at the outer surface of a ceramic element assembly. When distances from side surfaces of the ceramic assembly on which first and second external electrodes are provided to the inner edges of the first and second extended portions are defined as $L_1$ and $L_2$, respectively, and a distance between side surfaces and the end of the second internal electrode or the end of the first internal electrode is defined as $G_2$ or $G_1$, $G_2 > L_1$ and $G_1 > L_2$ are satisfied.

14 Claims, 11 Drawing Sheets

FOREIGN PATENT DOCUMENTS

| | | | |
|---|---|---|---|
| JP | 2004095680 A | * | 3/2004 |
| JP | 2006-332601 A | | 12/2006 |
| WO | 2007/049456 A1 | | 5/2007 |

OTHER PUBLICATIONS

Kunishi et al.: "Laminated Electronic Component and Method for Manufacturing the Same"; U.S. Appl. No. 12/030,282, filed Feb. 13, 2008.

Tani: "Multilayer Electronic Component and Method for Manufacturing the Same"; U.S. Appl. No. 12/481,690, filed Jun. 10, 2009.

Sasabayashi, "Multilayer Ceramic Electronic Component", U.S. Appl. No. 12/765,965, filed Apr. 23, 2010.

Kunichi et al., "Laminated Electronic Component and Method for Manufacturing the Same", U.S. Appl. No. 12/796,688, filed Jun. 9, 2010.

* cited by examiner

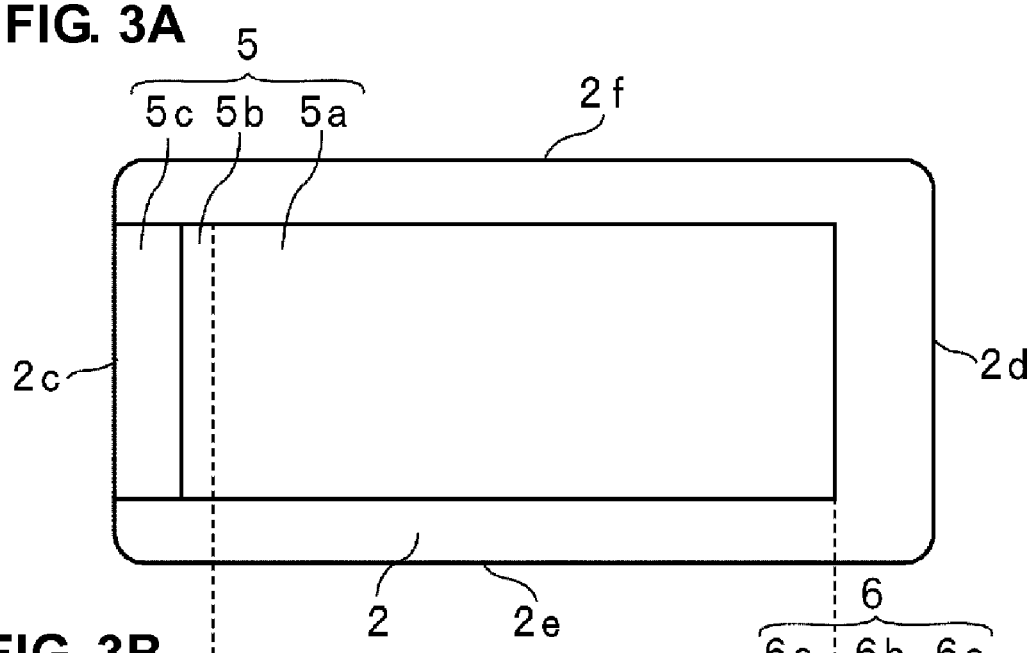
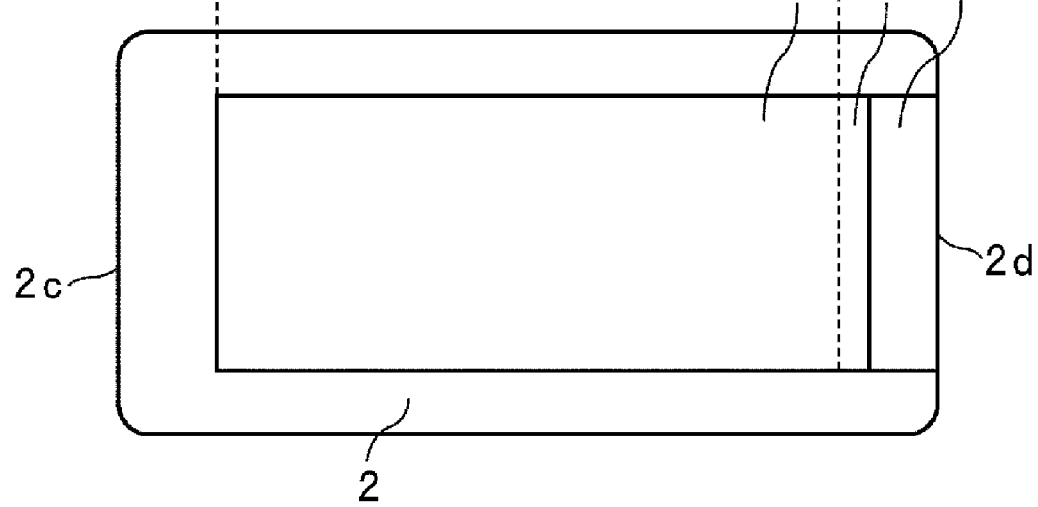

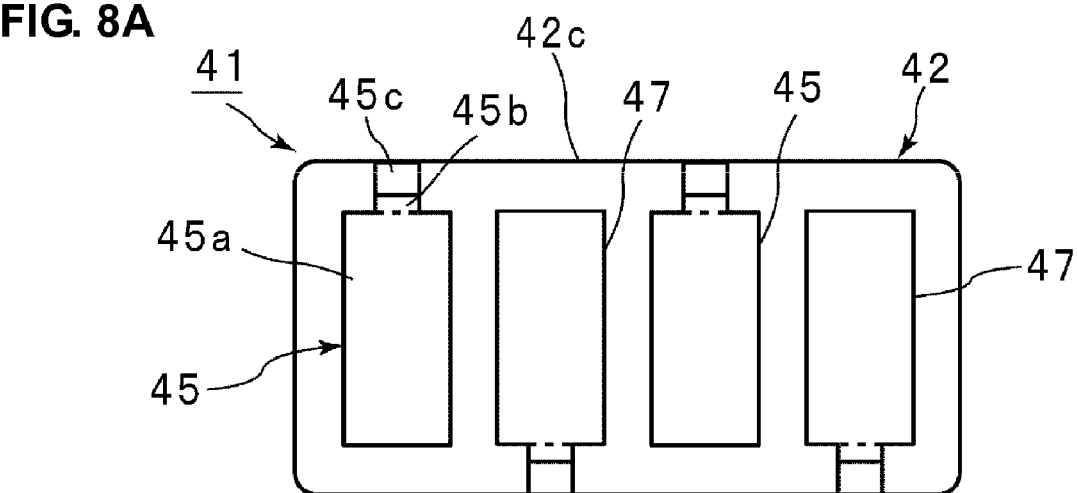
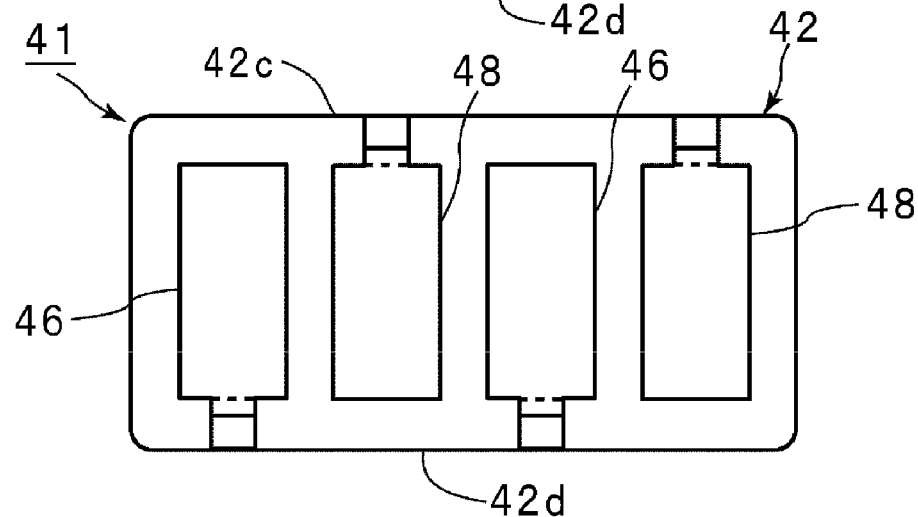

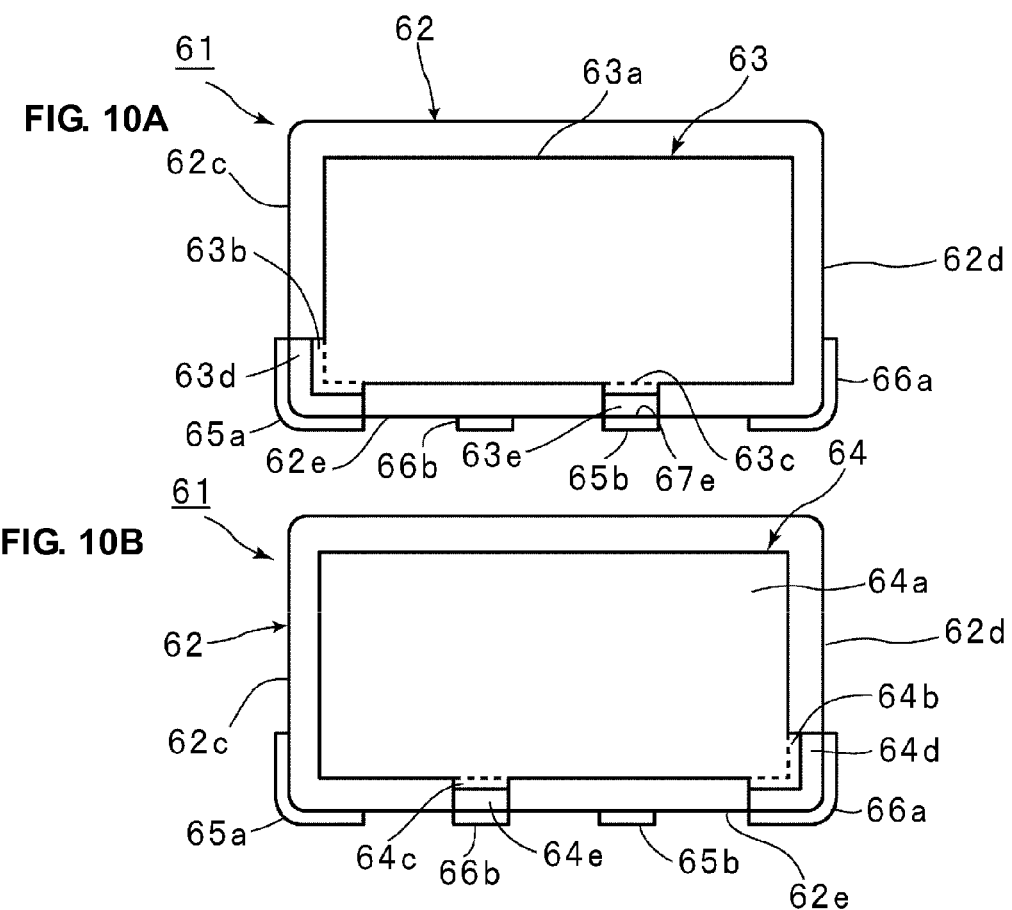

LAMINATED CERAMIC ELECTRONIC COMPONENT

BACKGROUND OF THE INVENTION

1. Field of the Invention

The present invention relates to a laminated ceramic electronic component, such as a laminated ceramic capacitor. More particularly, the present invention relates to a laminated ceramic electronic component in which an internal electrode extended portion includes a thick film portion whose film thickness is relatively large.

2. Description of the Related Art

The size of portable electronic apparatuses, such as cellular phones or digital cameras, has been increasingly reduced. Therefore, for laminated ceramic electronic components, such as a laminated ceramic capacitor, used in a portable electronic apparatus, a reduction in size and an increase in precision have been demanded. For example, in a laminated ceramic capacitor, the thickness of a ceramic layer between internal electrodes connected to different electric potentials has been reduced to be about 3 μm or less.

External electrodes of the laminated ceramic capacitor are formed by applying and printing a conductive paste onto the ends of a ceramic element assembly. In the external electrodes, the conductive paste tends to predominantly adhere to the center of the end surface of the ceramic element assembly when the conductive paste is applied. Therefore, the external electrodes are partially thick on the end surfaces of the ceramic element assembly, and the thickness may exceed about 30 μm. Therefore, even when a reduction in size of the ceramic element assembly has been attempted, the external dimensions of the laminated ceramic capacitor have been increased.

In view of the above-described problems, WO 2007/049456 discloses a method of forming external electrodes on the end surfaces of the ceramic element assembly by directly performing plating thereon. In WO 2007/049456, as illustrated in FIG. 11, internal electrodes 102 and 103 are exposed at an end surface 101a of a ceramic element assembly 101. The exposed portions of the internal electrodes 102 and 103 are typically recessed into the end surface 101a. A plating film is deposited on exposed portions 102a and 103a of the internal electrodes 102 and 103, and then grown. Therefore, even when the internal electrodes 102 and 103 are recessed into the end surface 101a, the plating film connecting the internal electrodes 102 and 103 is formed. Compared to an external electrode formation method using a conductive paste, the external electrode formation method using a plating film produces thin and flat external electrodes.

According to the external electrode formation method using a conductive paste, bonding strength is increased by a glass component in the conductive paste. In contrast, there has been a problem with the above-mentioned plating method in that the fixing strength of the plating film to the ceramic element assembly is relatively low.

Therefore, in Japanese Unexamined Patent Application Publication No. 2006-332601, increasing the fixing strength of external electrodes by increasing the thickness of the internal electrodes in a portion where the internal electrodes are exposed has been disclosed.

In the structure described in Japanese Unexamined Patent Application Publication No. 2006-332601, the thickness of internal electrodes is relatively large in a portion where the internal electrodes are exposed. The relatively thickened portion is referred to as a thick film portion. When the thick film portion is provided, there have been problems in that the inner ends of the thick film portion are overlapped with the ends of the internal electrodes connected to other electric potentials through a ceramic layer or insulation resistance is varies in a portion where the inner ends of the thick film portion are adjacent to the ends of the internal electrodes connected to other electric potentials. This is caused by the fact that the inner ends of the thick film portion are blurred or indistinct when screen printing or other similar method is used to form the thick film portion. Therefore, a reduction in the variations in the properties of the laminated ceramic capacitor has not been achieved.

SUMMARY OF THE INVENTION

To overcome the problems described above, preferred embodiments of the invention provide a laminated ceramic electronic component that includes a relatively thick film portion provided at an internal electrode portion exposed at the outer surface of a ceramic element assembly, in which variations in properties, such as insulation resistance, are prevented.

Other preferred embodiments of the present invention provide a laminated ceramic electronic component in which external electrodes are formed on the front surface of a ceramic element assembly by plating, which is suitable for a reduction in size, and which has a relatively thick film portion at a portion at which internal electrodes are exposed at the outer surface of the ceramic element assembly, in which variations in properties are prevented by providing a relatively thick film portion on the internal electrodes.

According to a preferred embodiment of the present invention, a laminated ceramic electronic component includes a ceramic element assembly including a plurality of laminated ceramic layers having a first principal surface and a second principal surface that face each other and a plurality of side surfaces that connect the first principal surface and the second principal surface, first internal electrodes arranged in parallel or substantially in parallel to the first and second principal surfaces in the ceramic element assembly, and second internal electrodes arranged in the ceramic element so as to partially overlap the first internal electrodes with the ceramic layers therebetween, the first internal electrodes each having a first effective portion arranged in the ceramic element assembly, a first connecting portion that is connected to the first effective portion, and a first extended portion that is connected to the first connecting portion, is exposed at a side surface of the ceramic element assembly, and has a film thickness greater than that of the first connecting portion, the second internal electrodes each having a second effective portion that overlaps the first effective portion through the ceramic layer, a second connecting portion that is connected to the second effective portion, and a second extended portion that is connected to the second connecting portion, is exposed at a side surface of the ceramic element assembly, and has a film thickness greater than that of the second connecting portion, the laminated ceramic electronic component further including, a first external electrode provided on a side surface to which the first extended portions of the first internal electrodes are exposed, and a second external electrode provided on a side surface of the ceramic element assembly to which the second extended portions of the second internal electrodes are exposed, in which, $G_2 > L_1$ and $G_1 > L_2$ are satisfied when a distance from the side surface of the ceramic element assembly on which the first external electrode is provided to the inner end of each of the first extended portions is defined as $L_1$, a distance from the side surface on which the second external electrode is provided to the inner end of each of the second extended portions is defined as $L_2$, a distance between the side surface on which the first external electrode is provided and the end of each of the second internal electrodes is defined as $G_2$, and a distance between the end of each of the first internal electrodes and the side surface on which the second external electrode is formed is defined as $G_1$.

Preferably, when the thickness of each of the ceramic layers is defined as c, the thickness of each of the first connecting portions is defined as $e_1$, the thickness of each of the second connecting portions is defined as $e_2$, the thickness of each of the first extended portions is defined as $t_1$, and the thickness of each of the second extended portions is defined as $t_2$, $(G_1-L_2)^2+\{c-(t_2-e_2)\}^2 \geqq c^2$ and $(G_2-L_1)^2+\{c-(t_1-e_1)\}^2 \geqq c^2$ are satisfied. In this case, the first and second extended portions having a sufficient thickness can be provided and influences on properties, such as insulation resistance between the first and second extended portions and the ends of the second and first internal electrodes connected to different electric potentials are reduced.

The laminated ceramic electronic component according to another preferred embodiment of the present invention includes the plurality of side surfaces or first and second side surfaces on which the first and second external electrodes are provided, and the first and second external electrodes having first and second plating films, respectively, provided on the side surfaces of the ceramic element assembly, the laminated ceramic electronic component preferably further includes first and second surface conductors provided on at least one of the first and second principal surfaces at sides of the first side surface and the second side surface, respectively, of the ceramic element assembly, the first plating film having an extension portion extending to at least one of the first and second principal surfaces so as to cover the first surface conductor provided at the side of the first side surface, and the second plating film having an extension portion extending to at least one of the first and second principal surfaces so as to cover the second surface conductor provided at the side of the second side surface.

In the laminated ceramic electronic component according to still another preferred embodiment of the present invention, the first surface conductor preferably does not overlap the first extended portions in the lamination direction of the ceramic layer, and the second surface conductor preferably does not overlap the second extended portions in the lamination direction. Therefore, an unnecessary level difference is not generated between the first surface conductor and the first extended portions and between the second surface conductor and the second extended portions. Accordingly, structural defects of the laminated ceramic electronic component are prevented.

Preferably, the first surface conductor and the second surface conductor include a first surface located at the outside and a second surface that is an opposite principal surface, and the first surface conductor and the second surface conductor are embedded in the ceramic element assembly from the second surface sides so that the first surfaces of the surface conductors are exposed.

Preferably, the first surface of the first surface conductor and the first surface of the second surface conductor are substantially flush with the first principal surface or the second principal surface of the ceramic element assembly. Therefore, the size of the laminated ceramic electronic component can be further reduced.

Preferably, the first and second connecting portions are integrally provided with the first and second effective portions having the same film thickness as that of the first and second effective portions. In this case, the first and second effective portions and the first and second connecting portions can be efficiently and simultaneously formed preferably by applying and printing the conductive paste, for example.

Preferably, the first and second extended portions have first metal layers that are integrally formed with the first and second connecting portions using the same metal as that of the first and second connecting portions and a second metal layer laminated on the first metal layer. In this case, when the first metal layer is formed using the same metal as that of the first and second effective portions or the first and second connecting portions simultaneously with the formation thereof, the first and second extended portions can be easily formed simply by laminating the second metal layer on the first and second extended portion formation portions.

Preferably, the ceramic element assembly has a substantially rectangular parallelepiped shape, the side surfaces on which the first and second external electrodes are formed, respectively, are first and second end surfaces that face each other, the first extended portions of the first internal electrodes are exposed at the first end surface, and the second extended portions of the second internal electrodes are exposed at the second end surface. In this case, a laminated ceramic electronic component having a substantially rectangular parallelepiped shape and having less variations in properties can be obtained.

Preferably, a plurality of electronic component units in which the first and second internal electrodes are laminated with the ceramic layers therebetween are provided side by side in the ceramic element assembly. In this case, preferably, a plurality of pairs of the first and second external electrodes are provided so as to correspond to each of the plurality of the electronic component units. Thus, a plurality of electronic component units having less variations in properties can be defined by one laminated ceramic electronic component.

Preferably, the first and second extended portions of the first and second internal electrodes are made thicker than the first and second connecting portions and $G_2 > L_1$ and $G_1 > L_2$ are satisfied. Therefore, variations in insulation resistance between the first and second extended portions and the ends of the second and first internal electrodes connected to electric potentials different from those of the first and second extended portions are prevented. Therefore, a laminated ceramic electronic component having less variations in electrical properties can be provided.

Thus, the film thickness of the first and second extended portions is relatively large, and variations in the properties of the laminated ceramic electronic component are reduced even when the first and second external electrodes defined by plating films that are directly formed on the outer surfaces of the ceramic element assembly are provided to thereby to reduce the size of the laminated ceramic electronic component. In other words, a more compact and stable laminated ceramic electronic component can be provided without increasing variations in properties.

Other features, elements, arrangements, steps, characteristics and advantages of the present invention will become more apparent from the following detailed description of preferred embodiments of the present invention.

BRIEF DESCRIPTION OF THE DRAWINGS

FIGS. 3A and 3B are schematic planar cross sectional views at the locations at which first internal electrodes and second internal electrodes are provided in the first preferred embodiment of the present invention.

FIGS. 8A and 8B are a schematic planar cross sectional view at a certain location and a schematic planar cross sectional view at a different location in the laminated ceramic electronic component according to the fourth preferred embodiment of the present invention.

FIGS. 10A and 10B are schematic planar cross sectional views of another modified example of the laminated ceramic electronic component according to a preferred embodiment of the present invention.

DETAILED DESCRIPTION OF PREFERRED EMBODIMENTS

Hereinafter, preferred embodiments of the present invention will be described with reference to the drawings.

Figure 1:
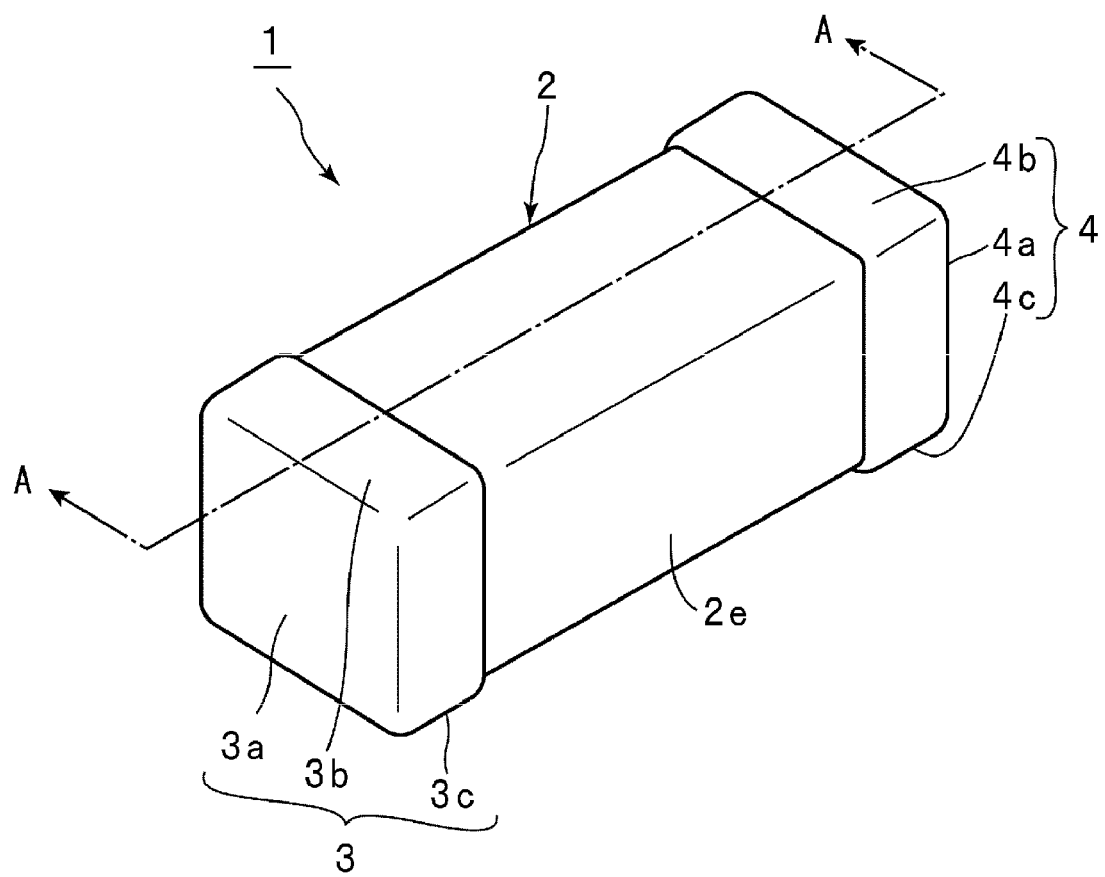
FIG. 1 is a perspective view of a laminated ceramic electronic component according to a first preferred embodiment of the present invention.
Figure 2:
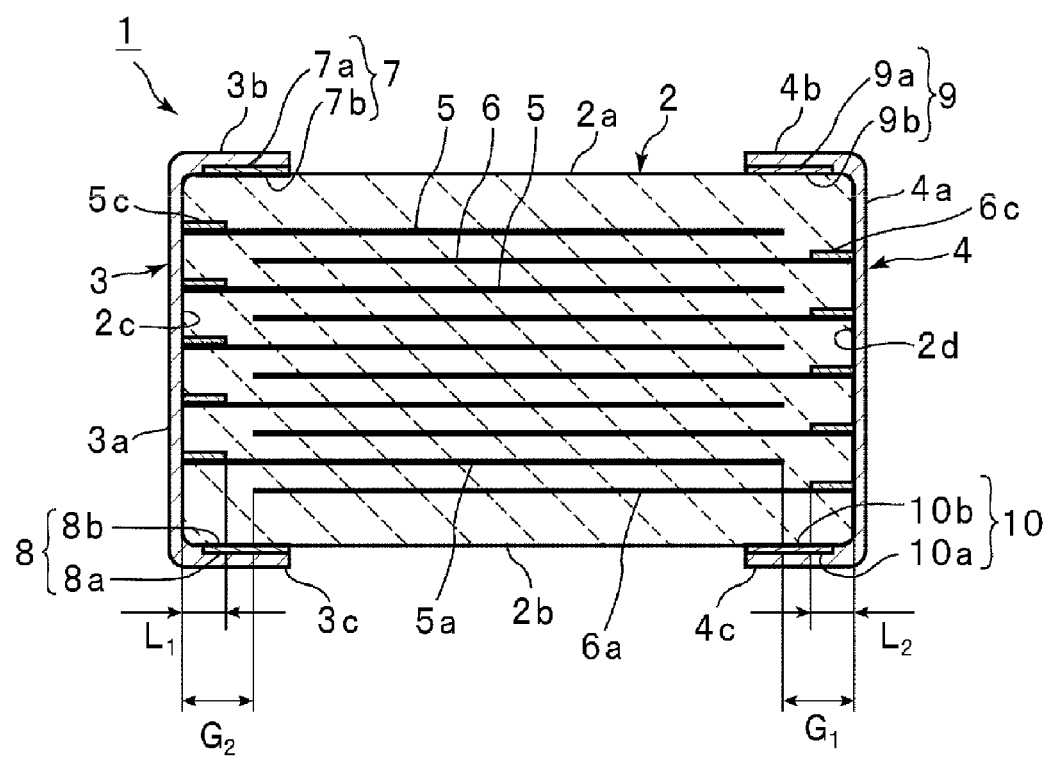
FIG. 2 is a front elevation cross sectional view of the laminated ceramic electronic component of the first preferred embodiment of the present invention.

FIG. 1 is a perspective view of a laminated ceramic electronic component according to a first preferred embodiment of the present invention, and FIG. 2 is a front elevation cross sectional view thereof.

A laminated ceramic electronic component 1 of this preferred embodiment is a laminated ceramic capacitor.

The laminated ceramic electronic component 1 includes a ceramic element assembly 2 having a substantially rectangular parallelepiped shape. The ceramic element assembly 2 includes a plurality of laminated ceramic layers. The ceramic element assembly 2 has a first principal surface 2a and a second principal surface 2b that faces the first principal surface 2a. The plurality of ceramic layers are laminated in a direction in which the first and second principal surfaces 2a and 2b are connected to each other. Therefore, the direction in which the first and second principal surfaces 2a and 2b are connected to each other is defined as a lamination direction. In FIG. 2, the first principal surface 2a is located at the top of the ceramic element assembly and the second principal surface 2b is located at the bottom of the ceramic element assembly. Therefore, in the following description, a location in the lamination direction in the ceramic element assembly 2 will be described using a "height position" as required.

The ceramic element assembly 2 has four side surfaces that connect the first and second principal surface 2a and 2b. FIG. 2 illustrates, among the four side surfaces, first and second end surfaces 2c and 2d that define the first and second side surfaces that face each other. FIG. 1 illustrates a third side surface 2e among the remaining side surfaces of the four side surfaces. A fourth side surface 2f that faces the third side surface 2e is illustrated in FIG. 3 described later.

The ceramic element assembly 2 is not limited to a ceramic element assembly having a substantially rectangular parallelepiped shape. Therefore, the shapes of the first and second principal surfaces 2a and 2b may preferably have a triangular, pentagonal, or hexagonal shape, for example. The ceramic element assembly 2 has a plurality of side surfaces in accordance with the planar shapes of the first and second principal surfaces 2a and 2b.

A first external electrode 3 is configured so as to cover the first end surface 2c of the ceramic element assembly 2 and a second external electrode 4 is configured so as to cover the second end surface 2d.

The first external electrode 3 has an end surface portion 3a covering the first end surface 2c, a first extension portion 3b that is connected to the upper end of the end surface portion 3a and extends to the first principal surface 2a, and a second extension portion 3c that is connected to the upper end of the end surface portion 3a and extends to the second principal surface 2b. Similarly, the second external electrode 4 has an end surface portion 4a, a first extension portion 4b, and a second extension portion 4c.

In this preferred embodiment, the first and second external electrodes are preferably defined by a plating film formed on the outer surface of the ceramic element assembly 2 by directly performing plating thereon.

In the ceramic element assembly 2, a plurality of first internal electrodes 5 and a plurality of second internal electrodes 6 partially overlap each other with the ceramic layers therebetween.

FIG. 3A is a planar cross sectional view at a height position at which one of the first internal electrodes 5 is disposed and FIG. 3B is a planar cross sectional view at a height position at which one of the second internal electrodes 6 is disposed in the ceramic element assembly 2.

Each of the first internal electrodes 5 includes a first effective portion 5a, a first connecting portion 5b, and a first extended portion 5c. Similarly, each of the second internal electrodes 6 includes a second effective portion 6a, a second connecting portion 6b, and a second extended portion 6c. The first and second effective portions overlap each other with the ceramic layers therebetween. In the overlapping portions, the electrostatic capacitance of the laminated ceramic capacitor is extracted.

In contrast, the first connecting portions 5b are connected to the end portions opposite the ends of the first effective portions 5a of the first internal electrodes 5. The end portions opposite the first effective portions 5a of the first connecting portions 5b are connected to the first extended portions 5c. The thickness of the first extended portions 5c is greater than that of the first connecting portions 5b.

In this preferred embodiment, a conductive paste is preferably printed onto a ceramic green sheet such that the first internal electrode 5 has a planar surface shape. After an appropriate period of time, the conductive paste is further printed onto a portion at which the first extended portion 5c is provided, thereby increasing the thickness of the first extended portion 5c. More specifically, the first effective portion 5a and the first connecting portion 5b are integrally made using the same material.

Each of the second internal electrodes 6 also has a second effective portion 6a, a second connecting portion 6b, and a second extended portion 6c. The second extended portions 6c of the second internal electrodes 6 are exposed at the second end surface 2d.

The first and second internal electrodes 5 and 6 include the first and second extended portions 5c and 6c having increased film thicknesses. The thick first and second extended portions 5c and 6c are exposed at the end surfaces 2c and 2d, respectively. Therefore, when plating films are directly formed so as to cover the end surfaces 2c and 2d of the ceramic element assembly 2 when forming the first and second exterior electrodes 3 and 4, the plating films are grown on the thick first and second extended portions 5c and 6c, and thus, plating films having excellent bonding strength are formed.

On the first principal surface 2a and the second principal surface 2b, first surface conductors 7 and 8 are formed at a side of the first end surface 2c, respectively. The first surface conductor 7 can be formed by applying and printing a conductive paste onto the first principal surface 2a. The first surface conductor 8 also can be similarly formed by applying and printing a conductive paste.

The first surface conductors 7 and 8 are configured so as to be covered with the first and second extension portions 3b and 3c, respectively. More specifically, the first surface conductors 7 and 8 are flat film-like conductors having first and second surfaces 7a and 7b and 8a and 8b, respectively. The first surfaces 7a and 8a located at the outside are covered with the first and second extension portions 3b and 3c and the second surfaces 7b and 8b are in contact with the first and second principal surfaces 2a and 2b of the ceramic element assembly 2.

Also at the side of the second end surface 2d, second surface conductors 9 and 10 are similarly arranged. The second surface conductors 9 and 10 also have first and second principal surfaces 9a and 9b and 10a and 10b, and the first principal surfaces 9a and 10a are covered with extension portions 4b and 4c.

Preferably, the first surface conductors 7 and 8 and the second surface conductors 9 and 10 are made of the same metal or alloy as the internal electrodes 5 and 6. However, the first surface conductors 7 and 8 and the second surface conductors 9 and 10 may be made of a metal or alloy different from that of the internal electrodes 5 and 6.

The first surface conductors 7 and 8 and the second surface conductors 9 and 10 are not necessarily provided. However, the first surface conductors 7 and 8 and the second surface conductors 9 and 10 are preferably provided because the bonding strength of the plating films defining the external electrodes 3 and 4 can be further increased thereby.

To increase the bonding strength of the first surface conductors 7 and 8 and the second surface conductors 9 and 10 to the ceramic element assembly 2, the first surface conductors 7 and 8 and the second surface conductors 9 and 10 are preferably formed using a conductive paste containing a glass component.

In the laminated ceramic electronic component 1 of this preferred embodiment, when the distance between the first end surface 2c and the edge at the side of the first connecting portion 5b of the first extended portion 5c is defined as $L_1$ and the distance between the end of the second internal electrode 6, i.e., the end portion at the side of the first end surface 2c of the second internal electrode 6, and the first end surface 2c is defined as $G_2$, $G_2 > L_1$ is satisfied. In addition, at the side of the second end surface 2d, when the distance between the second end surface 2d and the inner edge of the second extended portion 6c is defined as $L_2$ and the distance between the end of the first internal electrode 5, i.e., the end portion at the side of the end surface 2d of the first internal electrode 5, and the second end surface 2d is defined as $G_1$, $G_1 > L_2$ is satisfied.

Therefore, at the side of the first end surface 2c, the first extended portions 5c and the second internal electrodes 6 are not adjacent to each other, and thus, variations in insulation resistance therebetween can be effectively prevented. Similarly, the second extended portions 6c and the ends of the first internal electrodes 5 are not adjacent to each other at the side of the second end surface 2d, and thus, variations in insulation resistance therebetween can be effectively prevented.

Therefore, in the laminated ceramic electronic component 1 of this preferred embodiment, variations in electrical properties can be effectively reduced in a structure in which the plating films are directly formed on the outer surface of the ceramic element assembly as the first and second external electrodes 3 and 4 and the bonding strength of the plating films is increased by increasing the thickness of the first and second extended portions 5c and 6c. Thus, even when the thickness of the ceramic layers between the internal electrodes connected to different electric potentials is reduced to thereby attempt to further reduce the size and increase the capacitance, a laminated ceramic capacitor with fewer variations in electrical properties can be provided.

The first and second external electrodes 3 and 4 may preferably include only the above-mentioned plating films, or may preferably include another plating film formed outside the plating films. In that case, as the plating film defining a base directly formed on the outer surface of the ceramic element assembly 2, it is preferable to use at least one metal selected from the group consisting of Cu, Ni, Sn, Pb, Au, Ag, Pd, Bi, and Zn or an alloy including the metal as a main component, for example. One or more other plating films to be formed on the plating film defining a base are preferably formed using the same metal or alloy as described above. When the internal electrodes are made of, for example, Ni, the plating film directly formed on the front surface of the element assembly is preferably made of a metal having excellent bonding properties with Ni, such as Cu, or an alloy including Cu as a main component, for example.

In the structure in which a plurality of plating films are laminated, it is preferable to use Sn or Au, for example, having excellent solder wettability as a plating film at the outermost side. In this case, one of the plating films among the plating film made of Sn or Au is preferably made of Ni, for example, having excellent solder barrier properties.

When the external electrode 3 and 4 are formed by laminating a plurality of plating films, the thickness of the plating films is preferably about 15 μm or less per layer, for example, so as to reduce the size.

Next, an example of a method for producing the laminated ceramic electronic component 1 of this preferred embodiment will be described.

In the production of the laminated ceramic electronic component 1, a plurality of ceramic green sheets and an internal electrode forming conductive paste are prepared. On the ceramic green sheet, a conductive paste is printed by screen printing or other suitable method in accordance with the planar surface of the internal electrodes 5 or the internal electrodes 6 to thereby form an internal electrode pattern in which a plurality of internal electrodes 5 are aligned. In this case, at a portion where the first extended portion 5c is formed, the same conductive paste or another conductive paste is further applied to thereby form the first extended portion 5c having an increased film thickness. On a first ceramic green sheet, an internal electrode pattern in which a plurality of second internal electrodes 6 are aligned and formed is similarly formed.

After an appropriate period of time, a desired number of the ceramic green sheets on which the internal electrode pattern having the first internal electrodes is printed and a desired number of the ceramic green sheets on which the internal electrode pattern having the second internal electrodes is formed are alternately laminated, and a desired number of ceramic green sheets defining outer layers on which the internal electrode pattern is not printed are laminated on the top and bottom surfaces. Thus, a mother laminate is produced.

The mother laminate 2 is pressurized in the thickness direction. After an appropriate period of time, the mother laminate is cut into each laminated ceramic capacitor unit to thereby obtain a green chip. The green chip is baked to thereby obtain a ceramic element assembly. The ceramic element assembly is polished as required to thereby sufficiently expose the first and second internal electrodes 5 and 6 to the end surfaces 2c and 2d. After an appropriate period of time, plating is performed so as to cover the first and second end surfaces 2c and 2d to thereby form the external electrode 3 and 4. When a plurality of plating films are laminated to define the external electrodes 3 and 4, a plating film defining a base may preferably be formed, and one or more upper plating films may preferably be further formed by a plating method.

As the plating method, either electrolytic plating or electroless plating may be used. When electroless plating is used, a pretreatment using a catalyst is required so as to increase a plating film deposition rate. Thus, the process is relatively complicated. Therefore, it is preferable to use electrolytic plating in order to simplify the process. As a specific plating method, barrel plating is preferably used because the mass productivity is excellent.

In the preferred embodiment described above, the conductive paste is printed onto the ceramic green sheet, and the conductive paste is further printed at a portion at which the first extended portion 5c is disposed. However, the first extended portion 5c may preferably be formed by one printing of the conductive paste. For example, the first extended portion 5c may be formed by printing the conductive paste on a portion at which the first effective portion 5a and the first connecting portion 5b are formed, and then printing the conductive paste with a greater thickness to a portion at which the first extended portion 5c is formed so as to be in contact with the first connecting portion 5b.

A preferred method includes printing the same conductive paste as that of the first connecting portion 5b to a portion at which the first extended portion 5c is formed, and, after an appropriate period of time, printing the conductive paste only on the first connecting portion 5b as in the preferred embodiment described above. Thus, the first extended portion 5c can be securely electrically connected to the first connecting portion 5b.

In a process of printing an additional conductive paste to increase the thickness, a different conductive paste may be used, and thus, bonding strength with a plating film can be further increased. More specifically, when a plurality of conductive pastes are printed when forming the first extended portion 5c, the types of the plurality of conductive pastes may be different from each other. When the conductive paste is printed integrally with the first connecting portion 5b and the first effective portion 5a, it is preferable to use, for example, Ni or Ag with less electric resistance, and, for the conductive paste to be printed thereon, it is preferable to use a metal having excellent bonding properties with a plating film, such as Cu, for example.

In order to achieve a reduction in size and an increase in capacitance, the thickness of the ceramic layers inserted between the first internal electrode 5 and the internal electrode 6 is preferably about 10 μm or less after baking, for example. In order to achieve an increase in capacitance, it is preferable that the thickness of the ceramic layer be reduced. However, when the thickness is less than about 0.1 μm, a short circuit between the first and second internal electrodes is likely to occur. Therefore, the thickness of the ceramic layer is preferably about 0.1 μm to about 10 μm, for example.

In the internal electrodes 5 and 6, the thickness of the first and second effective portions 5a and 6a and the thickness of the first and second connecting portions 5b and 6b are preferably the same or substantially the same, but may alternatively be different. The thickness of the first and second effective portion and the thickness of the first and second connecting portions 5b and 6b are preferably about 0.1 μm to about 2.0 μm after baking, for example. When the thickness is less than about 0.1 μm, the internal electrode may be partially omitted and the internal electrode shape may vary. In contrast, when the thickness exceeds about 2.0 μm, the cost increases.

The thickness of the first and second extended portions 5c and 6c whose film thickness is relatively large is preferably greater than that of the first and second connecting portions 5b and 6b. It is preferable that the thickness of the first and second extended portions 5c and 6c be about 1.5 to about 2.5 times the thickness of the first and second connecting portions 5b an 6c, and about 0.15 μm to about 5.0 μm in terms of absolute value, for example. When the thickness of the first and second extended portions 5c and 6c are not in this range, the bonding strength between the plating film and the internal electrodes cannot be sufficiently increased. When the thickness is excessively large, a structural defect may arise.

When the thickness of the ceramic layer located between the internal electrode 5 and the internal electrode 6 is defined as c, the thickness of the first connecting portion 5b is defined as $e_1$, the thickness of the second connecting portion 6b is defined as $e_2$, the thickness of the first extended portion 5c is defined as $t_1$, and the thickness of the second extended portion 6c is define as $t_2$, the thicknesses are preferably within the range of $(G_1-L_2)^2+\{c-(t_2-e_2)\}^2 \geqq c^2$ (Equation (1)) and $(G_2-L_1)+\{c-(t_1-e_1)\}^2 \geqq c^2$ (Equation (2)).

When the thickness of the ceramic layer, the thickness of the first and second connecting portions 5b and 6, and the thickness of the first and second extended portions 5c and 6c are within the above-described preferable ranges, influences of electrical properties, such as insulation resistance between the first and second extended portions 5c and 6c or the first and second extended portions 5c and 6c and the internal electrodes connected to different electric potentials can be sufficiently suppressed. Thus, the above-mentioned ranges are preferable.

When it is confirmed whether or not Equations (1) and (2) defining the preferable ranges are satisfied, the ceramic element assembly is cut in the thickness direction at an appropriate location, and then the thickness of the ceramic layer, the thickness of the first and second connecting portions 5b and 6b, and the thickness of the first and second extended portions 5c and 6c may be observed with an electron microscope or other suitable instrument, and determined.

Most preferably, all of the ceramic layers inserted between the internal electrodes and all the first and second internal electrodes 5 and 6 satisfy Equations (1) and (2) which indicate the preferable ranges. Equations (1) and (2) may be substantially satisfied in a pair of the first and second internal electrodes 5 and 6 located at the uppermost portion in the thickness direction, a pair of the first and second internal electrodes 5 and 6 located at the approximate center in the thickness direction, and a pair of the first and second internal electrodes 5 and 6 located at the lowest portion at each of the sides of the first and second end surfaces.

When a difference between the thickness of the extended portions 5c and 6c and the thickness of the connecting portions 5b and 6b is determined, the thickness of a portion at which the extended portions 5c and 6c are exposed at the outer surface of the ceramic element assembly is defined as the thickness of the extended portions 5c and 6c and the thickness of the connecting portions 5b and 6b located inside the end portion opposite a portion at which the extended portions 5c and 6c are exposed at the outer surface of the ceramic element assembly may be used as the thickness of the connecting portions 5b and 6b. Therefore, the thickness may be determined at the end portion at a side at which the extended portions 5c and 6c are exposed at the outer surface of the ceramic element assembly and at the end portion of a side opposite thereto.

Figure 4:
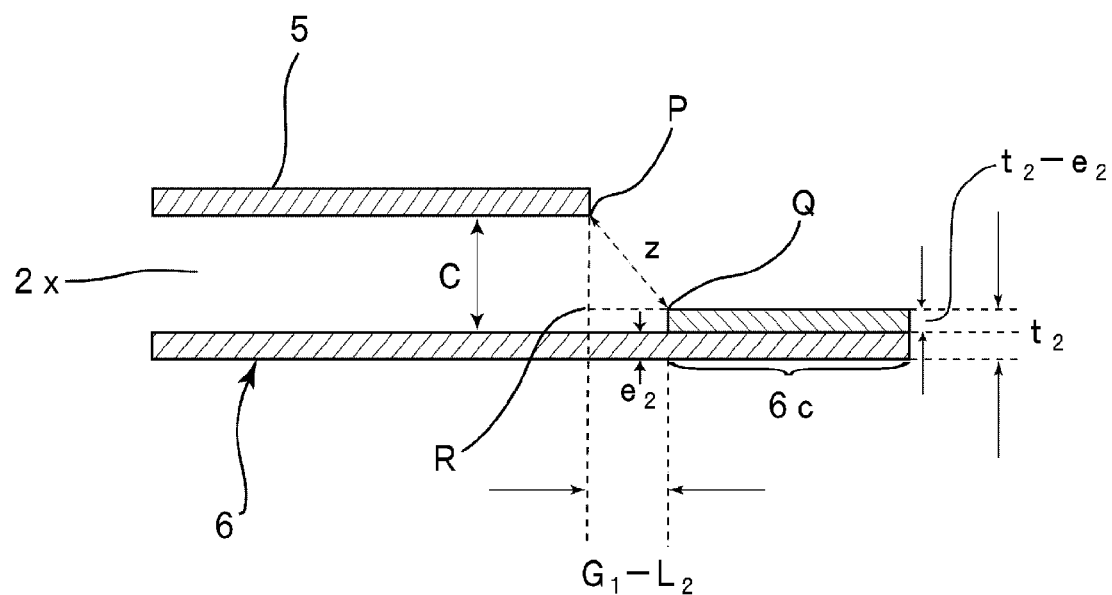
FIG. 4 is a schematic view of a preferable relationship in the distance between the internal electrodes and the thickness of extended portions in a portion in which the first internal electrodes and the second internal electrodes are laminated.

The fact that it is preferable to satisfy Equation (1) will be more specifically described with reference to FIG. 4. FIG. 4 schematically illustrates a portion at which the first internal electrode 5 and the second internal electrode 6 overlap each other through a ceramic layer 2x. Here, the thickness of the ceramic layer 2x is c. $(G_1-L_2)^2+\{c-(t_2-e_2)\}^2$ is equivalent to the square of a distance z of FIG. 4. More specifically, in a right angled triangle PQR defined by a point P located at the end portion of the undersurface of the first internal electrode 5, an inner end Q of the upper surface of the second extended portion 6c of the second internal electrode 6, and a point R located at the same height position as the point Q and directly under the point P, the length of an oblique side PQ is defined as z. The length of a side QR is $(G_1-L_2)$ and the length of a side PR is $\{c-(t_2-e_2)\}$. Therefore, the left side of Equation (1) above is the square of the distance z. In other words, the range satisfying Equation (1) means that the length of the side PQ is equal to or greater than the thickness c of the ceramic layer. When z becomes shorter than the thickness c, the insulation resistance deteriorates.

The same applies to Equation (2), and the same conditions are prescribed in the portion in which the first extended portion 5c of the second internal electrode 5 is located.

It is also preferable to satisfy about $2\,\mu m \leq L_1 \leq (G_1-10)\,\mu m$ and $2\,\mu m \leq L_2 \leq (G_2-10)\,\mu m$. When $L_1$ and $L_2$ are less than about 2 μm, it is difficult to form the first and second extended portions 5c and 6c having a sufficient thickness by printing the conductive paste.

Figure 5:
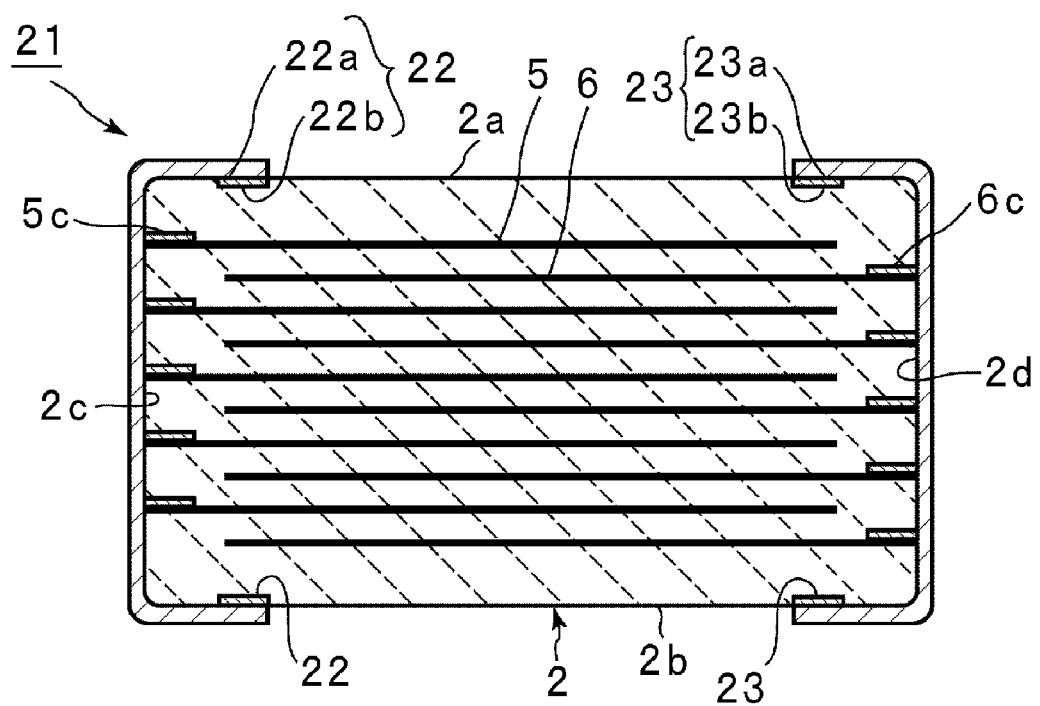
FIG. 5 is a front elevation cross sectional view of a laminated ceramic electronic component according to a second preferred embodiment of the present invention.

FIG. 5 is a vertical cross sectional view of a laminated ceramic electronic component according to a second preferred embodiment of the present invention. A laminated ceramic electronic component 21 is substantially the same as that of the first preferred embodiment except that the structure and formation location of the surface conductor is different from that of the first preferred embodiment. Therefore, the same components are designated by the same reference numerals, and the detailed descriptions thereof are omitted.

In the laminated ceramic electronic component 21, first and second surface conductors 22 and 23 are provided on the first principal surface 2a and the first and second surface conductors 22 and 23 are also provided on the second principal surface 2b at the side of the first end surface 2c and at the side of the second end surface 2d of the ceramic element assembly 2.

The first surface conductor 22 will be described as a representative example. The first surface conductor 22 is a film-like conductor having a first surface 22a as an outer principal surface and a second surface 22b as an inner principal surface. The first surface conductor 22 is disposed in the first principal surface 2a of the ceramic element assembly 2 from the side of the second surface 22b so that the first surface 22a is exposed. Here, the first surface 22a is flush or substantially flush with the first principal surface 2a of the ceramic element assembly 2.

Such a structure can be obtained by, for example, forming the surface conductor on the principal surface of a mother laminate, and then pressuring the mother laminate by pressing, such as hydrostatic pressure pressing, for example, in the lamination direction with a PET film or other suitable film interposed therebetween. Since the first surface 22a of the surface conductor 22 is flush or substantially flush with the first principal surface 2a of the ceramic element assembly 2, the outer surface of the extension portion 3b can be flattened even when the extension portion 3b of the first external electrode 3 is thin. Therefore, the height of electronic components can be further reduced.

The first surfaces 22a and 23a of the surface conductors 22 and 23 may be located below than the principal surface 2a of the ceramic element assembly 2. More specifically, the outer surfaces 22a and 23a may be embedded below the principal surface 2a by a pressure applied during printing of a surface conductor forming conductive paste.

In addition, in this preferred embodiment, the first surface conductor 22 is preferably arranged so as not to overlap the first extended portion 5c in the lamination direction. In other words, the edge at the side of the first end surface 2c of the first surface conductor 22 is located inside the inner edge of the first extended portion 5c in the direction in which the first and second end surfaces 2c and 2d are connected to each other. The second surface conductor 23 is also arranged so as not to overlap the second extended portion 6c in the lamination direction.

When the first and second surface conductors are formed on the principal surface of a mother laminate by printing of the conductive paste, a pressure during printing fluctuates at a boundary portion between the first extended portion or the second extended portion and the first or second connecting portion at an overlapped portion in the lamination direction. Therefore, the smoothness of each surface conductor may be deteriorated. In contrast, as in this preferred embodiment, when the first extended portion 5c or the second extended portion 6c is not present under the first and second surface conductors 22 and 23, i.e., in the lamination direction, such fluctuations in the pressure during printing does not occur. Therefore, the smoothness of the surface conductors 22 and 23 is not significantly deteriorated.

FIGS. 6A and 6B are views to describe a laminated ceramic electronic component in accordance with a third preferred embodiment of the invention. FIG. 6A is a planar cross sectional view at the height position at which the first internal electrode is disposed and FIG. 6B is a planar cross sectional view at the height position at which the second internal electrode is disposed.

In this preferred embodiment, a first internal electrode 32 includes a first effective portion 32a, a first connecting portion 32b, and a first extended portion 32c. The first effective portion 32a has a substantially rectangular planar shape, and is formed by printing of the conductive paste.

In this preferred embodiment, a first external electrode 34 includes an end surface portion 34a covering a first end surface 2c and extension portions 34b and 34c that extend to third and fourth side surfaces 2e and 2f, and has a substantially planar U shape. Corresponding to the extension portions 34b and 34c, the first extended portion 32c has a planar surface in which the first extended portion 32c is exposed not only at the end surface 2c but also at the end surfaces 2e and 2f. The first connecting portion 32b is configured to correspond to the inner edge of the first extended portion 32c, and is connected to three sides of the first effective portion 32a having a substantially planar U shape.

A second internal electrode 33 also has the same or substantially the same planar shape. More specifically, since the second external electrode 35 includes an edge portion 35a and extension portions 35b and 35c that extend to the third and fourth side surfaces 2e and 2f, a second extended portion 33c and a second connecting portion 33b are configured to correspond to the planar surface of the external electrode 35. A second effective portion 33a has a substantially rectangular planar surface similar to the first effective portion 32a.

In this preferred embodiment, the laminated ceramic electronic component 31 may be used by mounting the laminated ceramic electronic component 31 so that the plane direction of a plurality of internal electrodes 32 and 33 is in a direction perpendicular or substantially perpendicular to a mounting substrate. More specifically, the laminated ceramic electronic component 31 can be mounted via the extension portions 34b and 35b or extension portions 34c and 35c of the external electrodes 34 and 35.

Figure 7:
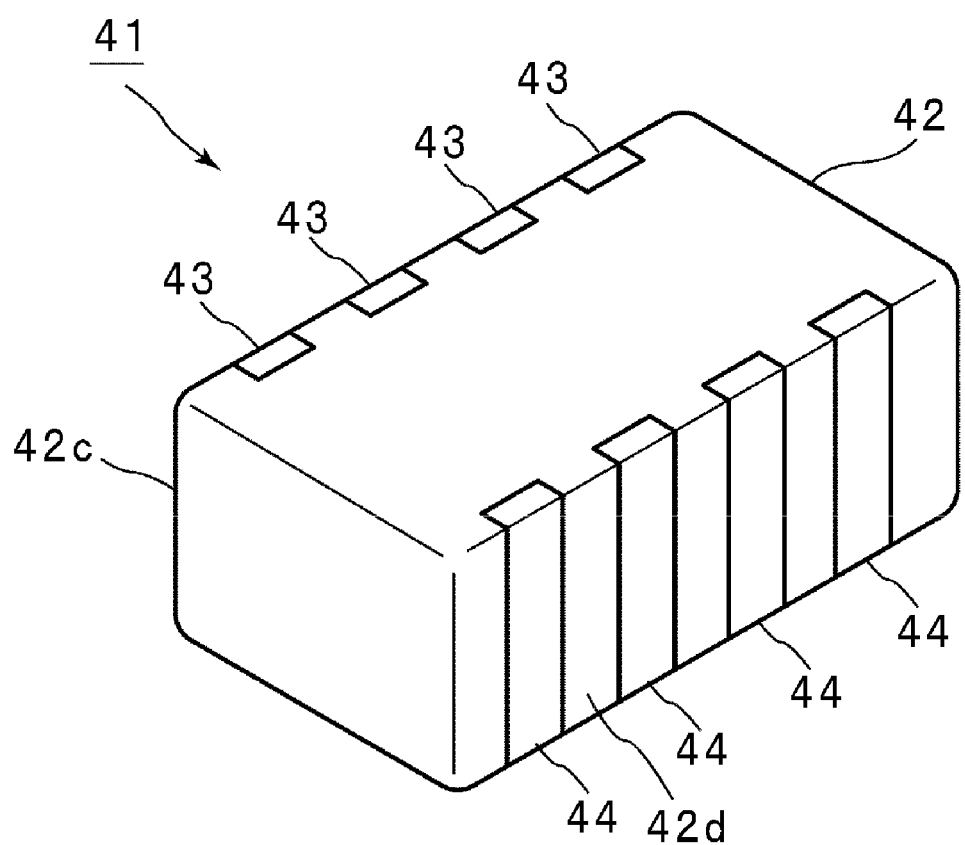
FIG. 7 is a perspective view of a laminated ceramic electronic component according to a fourth preferred embodiment of the present invention.

FIG. 7 is a perspective view of a laminated ceramic electronic component according to a fourth preferred embodiment of the present invention. FIGS. 8A and 8B are schematic substantially planar cross sectional views at different height positions of the laminated ceramic electronic component of this preferred embodiment.

Figure 6:
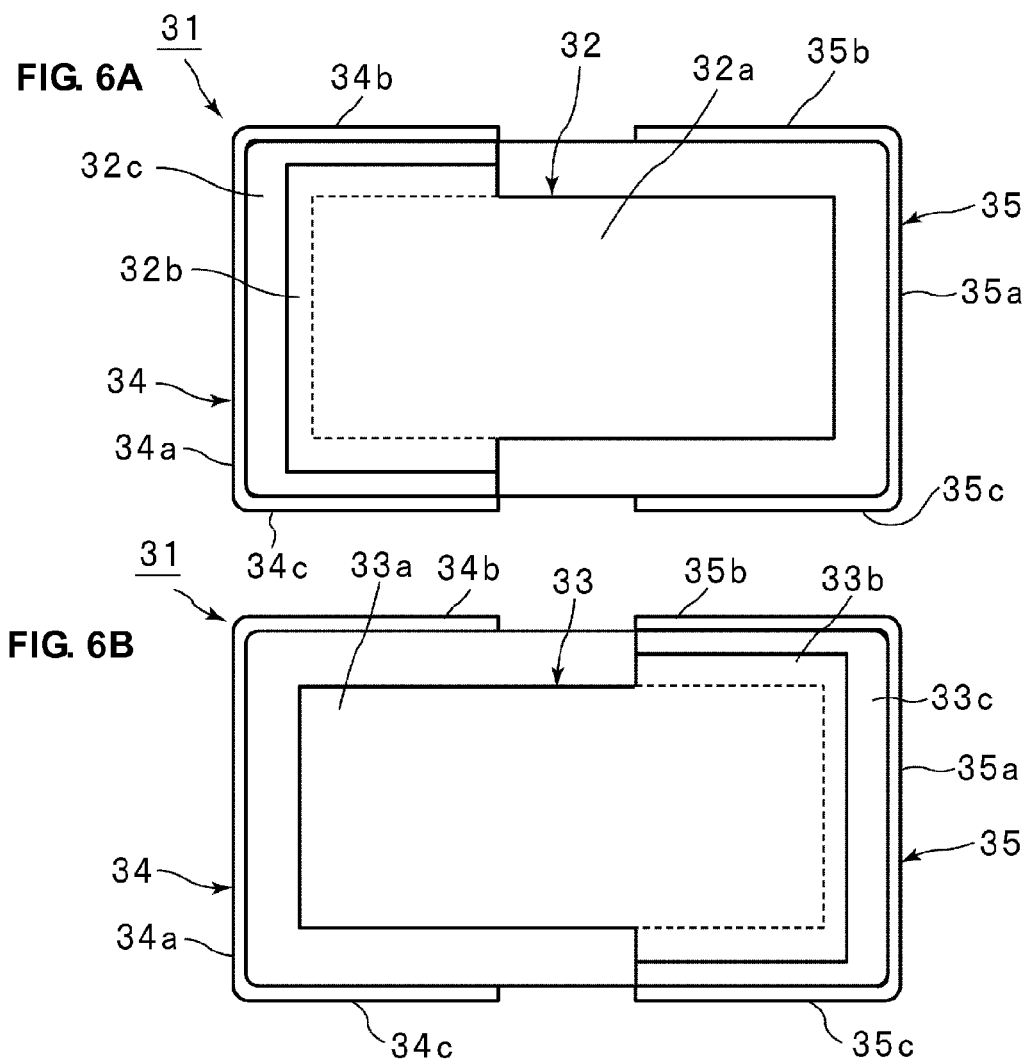
FIGS. 6A and 6B are schematic planar cross sectional views at the locations at which first internal electrodes and second internal electrodes of a laminated ceramic electronic component according to a third preferred embodiment of the present invention are provided.

A laminated ceramic electronic component 41 of a fourth preferred embodiment is a laminated ceramic capacitor array. Here, a plurality of capacitor units are provided side by side as a plurality of electronic component units in a ceramic element assembly 42. More specifically, a plurality of electronic component units including a first external electrode 43 and a second external electrode 44 illustrated in FIG. 6 are provided side by side.

One laminated ceramic capacitor unit is defined between a pair of the first and second external electrodes 43 and 44. More specifically, as illustrated in FIG. 8A, first internal electrodes 45 and 45 and first internal electrodes 47 and 47 are alternately arranged at a certain height position. Then, as illustrated in FIG. 8B, second internal electrodes 46 and 46 and second internal electrodes 48 and 48 are arranged at different height positions so as to overlap the first internal electrodes 45 and 45 or the first internal electrodes 47 and 47 with the ceramic layers therebetween. Thus, a plurality of laminated ceramic capacitor units are provided. Here, each of the adjacent first internal electrodes 45 and 47 extend to one facing side surface of the ceramic element assembly 42 or the other facing side surface thereof. The adjacent first internal electrodes 45 and 47 may preferably extend to the same side surface in the ceramic element assembly 42.

In such a laminated ceramic capacitor array, the bonding strength of a plating film can be increased and variations in electrical properties can be reduced similarly as in the preferred embodiment described above by providing an effective portion, a connecting portion, and an extended portion to each of the internal electrodes 45 and 47 and 46 and 48.

For example, when the first internal electrode 45 is used as an example, a first connecting portion 45b is provided so as to be connected to a first effective portion 45a for extracting electrostatic capacitance and a relatively thick first extended portion 45c is arranged so as to be connected to the first connecting portion 45b and to be exposed at a side surface 42c of the ceramic element assembly 42. Other first internal electrodes 47 and second internal electrodes 46 and 48 also have an effective portion, a connecting portion, and an extended portion similarly as above.

The laminated ceramic electronic component according to a preferred embodiment of the present invention may have a structure in which a plurality of component units are provided side by side in one electronic component element assembly similarly as in the laminated ceramic electronic component 41 as a laminated ceramic capacitor array.

The plurality of electronic component units are not limited to a plurality of electronic component units having the same or substantially the same function, and electronic components having different functions may preferably be provided in one ceramic element assembly.

Figure 9A:
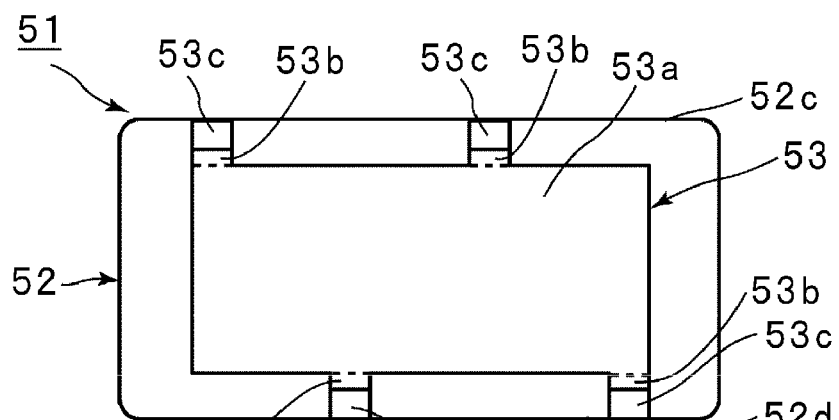
FIGS. 9A and 9B are schematic planar cross sectional views of a modified example of the laminated ceramic electronic component according to a preferred embodiment of the present invention.
Figure 9B:
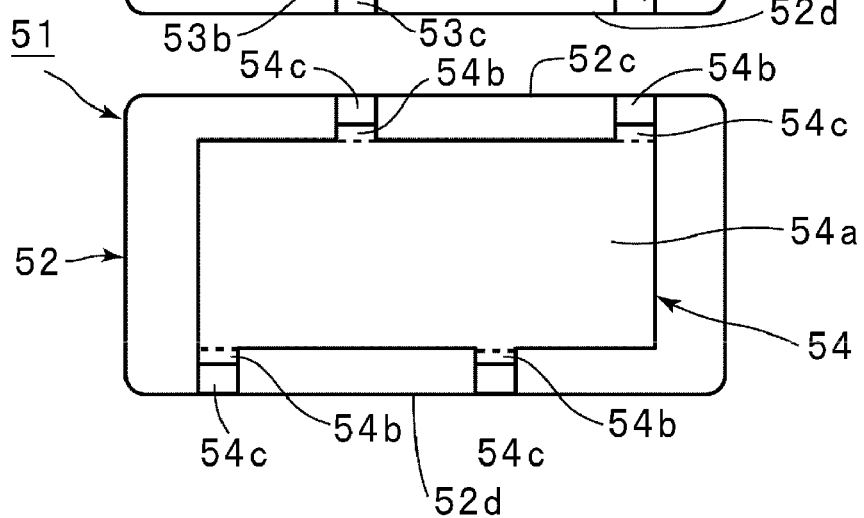
Figure 11:
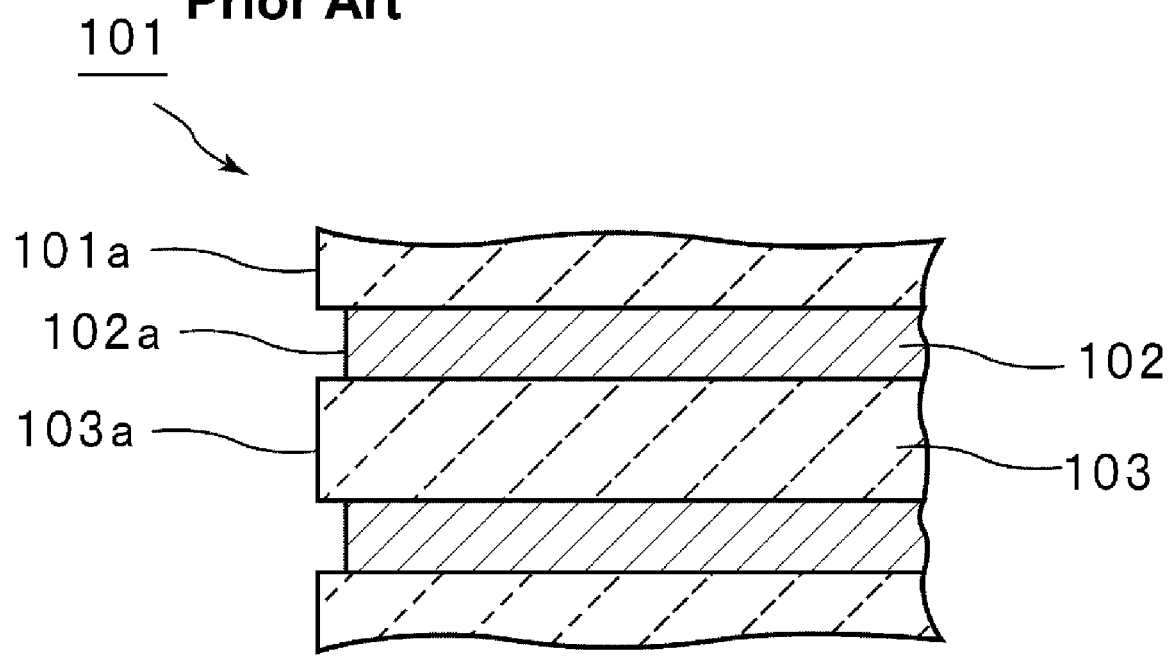
FIG. 11 a schematic partially cutaway cross sectional view of a method for producing a former laminated ceramic electronic component according to the related art.

FIGS. 9A and 9B are schematic planar cross sectional views to describe a modified example according to a preferred embodiment of the present invention. A laminated ceramic electronic component 51 of the modified example is a low ESR (Equivalent Series Resistance) type multi-terminal laminated ceramic capacitor. The laminated ceramic electronic component 51 includes a ceramic element assembly 52. In the ceramic element assembly 52, a first internal electrode 53 and a second internal electrode 54 are provided. The first internal electrode 53 includes a first effective portion 53a, a plurality of first connecting portions 53b, and a plurality of relatively thick first extended portions 53c each connected to the plurality of first connecting portions 53b and extended to a first side surface 52c or a second side surface 52d of the ceramic element assembly 52. Similarly, the second internal electrode 54 includes a second effective portion 54a and a plurality of first extended portions 54c.

Here, a portion at which the plurality of first extended portions 53c are exposed at the side surfaces 52c and 52d of the ceramic element assembly 52 and a portion at which the plurality of second extended portions 54c are exposed at the side surfaces 52c and 52d do not overlap each other in the lamination direction. Therefore, four external electrodes are provided on the first side surface 52c and four external electrodes are also provided on the second side surface 52d, whereby a multi-terminal laminated ceramic capacitor can be defined.

In such a multi-terminal laminated ceramic capacitor, variations in electrical properties can be reduced in a similar manner as in the first to fourth preferred embodiments described above by providing the relatively thick first and second extended portions.

FIGS. 10A and 10B are planar cross sectional views at different height positions for describing a laminated ceramic electronic component of another modified example according to a preferred embodiment of the present invention.

As illustrated in FIG. 10A, a first internal electrode 63 is provided at a certain height position of a ceramic element assembly 62. The first internal electrode 63 includes a first effective portion 63a and a plurality of first connecting portions 63b and 63c connected to the first effective portion 63a. The first internal electrode 63 includes a plurality of first extended portions 63d and 63e connected to the first connecting portions 63b and 63c and exposed at the outer surface of the ceramic element assembly 62. Therefore, two external electrodes 65a and 65b are formed by plating so as to be connected to each of the first extended portions 63d and 63e. Here, one first connecting portion 63b and one first extended portion 63d are located at the corner portion between a first side surface 62c and a third side surface 62e of the ceramic element assembly 62. Another first connecting portion 63c and another first extended portion 63e are arranged close to a side of a second side surface 62d relative to the approximate center of the third side surface 62e. Therefore, a plurality of first external electrodes 65a and 65b are provided.

A second internal electrode 64 includes a second effective portion 64a, a plurality of second extended portions 64b and 64c, and a plurality of second extended portions 64d and 64e that are similarly provided. The second extended portion 64d is located at the corner portion between the second side surface 62d and the third side surface 62e. The second extended portion 64e is arranged close to a side of the first side surface 62c relative to the approximate center of the third side surface 62e. Therefore, a plurality of second external electrodes 66a and 66b are provided.

As described above, in preferred embodiments of the present invention, a plurality of first external electrodes and second external electrodes may preferably be provided and first and second connecting portions and first and second extended portions may be provided in accordance with each external electrode. In this modified example, the first external electrodes 65a and 65b and a plurality of second external electrodes 66a and 66b are provided at a side of the third side surface 62e. Thus, the laminated ceramic electronic component 61 can be mounted on a substrate so that the internal electrodes 63 and 64 are perpendicular or substantially perpendicular to the mounting surface and the third side surface 62e defines the mounting surface.

In the preferred embodiment described above, a laminated ceramic capacitor has been described. However, the ceramic element assembly according to preferred embodiments of the present invention may preferably be a piezoelectric body or a semiconductor, for example. More specifically, preferred embodiments of the present invention also can be applied to laminated piezoelectric ceramic components or laminated ceramic thermistors, for example, having the same laminated structure.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A laminated ceramic electronic component, comprising:
a ceramic element assembly including a plurality of laminated ceramic layers including a first principal surface and a second principal surface that face each other and a plurality of side surfaces that connect the first principal surface and the second principal surface;
first internal electrodes located in parallel or substantially in parallel to the first and second principal surfaces in the ceramic element assembly; and
second internal electrodes arranged in the ceramic element assembly so as to partially overlap the first internal electrodes with the ceramic layers therebetween; wherein
each of the first internal electrodes includes a first effective portion disposed in the ceramic element assembly, a first connecting portion directly connected to the first effective portion, and a first extended portion directly connected to the first connecting portion;
the first extended portion is exposed at a first side surface of the side surfaces of the ceramic element assembly and has a film thickness greater than that of the first connecting portion;
each of the second internal electrodes includes a second effective portion that overlaps the first effective portion through one of the ceramic layers, a second connecting portion directly connected to the second effective portion, and a second extended portion directly connected to the second connecting portion;
the second extended portion is exposed at a second side surface of the side surfaces of the ceramic element assembly and has a film thickness greater than that of the second connecting portion;
the laminated ceramic electronic component further comprises:
a first external electrode provided on the first side surface to which the first extended portions of the first internal electrodes are exposed; and
a second external electrode provided on the second side surface of the ceramic element assembly to which the second extended portions of the second internal electrodes are exposed; wherein
in the laminated ceramic electronic component, $G_2 > L_1$ and $G_1 > L_2$ is satisfied when a distance from the first side surface of the ceramic element assembly on which the first external electrode is provided to an inner end of each of the first extended portions is defined as $L_1$, a distance from the second side surface on which the second external electrode is provided to an inner end of each of the second extended portions is defined as $L_2$, a distance between the first side surface on which the first external electrode is provided and an end of each of the second internal electrodes is defined as $G_2$, and a distance between an end of each of the first internal electrodes and the second side surface on which the second external electrode is provided is defined as $G_1$;
each of the first and second external electrodes includes one or more plating films; and
an upper main surface of each of the first and second extended portions is parallel or substantially parallel to upper main surfaces of the first and second connecting portions and the first and second effective portions.

2. The laminated ceramic electronic component according to claim 1, wherein
when a thickness of each of the ceramic layers is defined as c,
a thickness of each of the first connecting portions is defined as $e_1$,
a thickness of each of the second connecting portions is defined as $e_2$,
a thickness of each of the first extended portions is defined as $t_1$, and
a thickness of each of the second extended portion is defined as $t_2$,
$(G_1-L_2)^2 + \{c-(t_2-e_2)\}^2 \geq c^2$ and $(G_2-L_1)^2 + \{c-(t_1-e_1)\}^2 \geq c^2$ are satisfied.

3. The laminated ceramic electronic component according to claim 1, wherein
the first and second external electrodes include first and second plating films, respectively, provided on the first and second side surfaces of the ceramic element assembly;
the laminated ceramic electronic component further comprises first and second surface conductors provided on at least one of the first and second principal surfaces at sides of the first side surface and the second side surface, respectively, of the ceramic element assembly;
the first plating film includes an extension portion extending to at least one of the first and second principal surfaces so as to cover the first surface conductor provided at the side of the first side surface; and
the second plating film includes an extension portion extending to at least one of the first and second principal surfaces so as to cover the second surface conductor provided at the side of the second side surface.

4. The laminated ceramic electronic component according to claim 3, wherein the first surface conductor does not overlap the first extended portions in a lamination direction of the ceramic layer, and the second surface conductor does not overlap the second extended portions in the lamination direction.

5. The laminated ceramic electronic component according to claim 3, wherein the first surface conductor and the second surface conductor have a first surface located at an outside and a second surface that is opposed to the first surface, and the first surface conductor and the second surface conductor are embedded in the ceramic element assembly from the second surface sides so that the first surfaces of the surface conductors are exposed.

6. The laminated ceramic electronic component according to claim 5, wherein the first surface of the first surface conductor and the first surface of the second surface conductor are substantially flush with the first principal surface or the second principal surface of the ceramic element assembly.

7. The laminated ceramic electronic component according to claim 1, wherein the first and second connecting portions are integral with the first and second effective portions using the same or substantially the same film thickness as that of the first and second effective portions.

8. The laminated ceramic electronic component according to claim 1, wherein the first and second extended portions include a first metal layer that is integral with the first and second connecting portions using the same metal as that of the first and second connecting portions and a second metal layer laminated on the first metal layer.

9. The laminated ceramic electronic component according to claim 1, wherein the ceramic element assembly has a substantially rectangular parallelepiped shape, the first and second side surfaces on which the first and second external electrodes are provided, respectively, are first and second end surfaces that face each other, the first extended portions of the first internal electrodes are exposed at the first end surface, and the second extended portions of the second internal electrodes are exposed at the second end surface.

10. The laminated ceramic electronic component according to claim 1, wherein a plurality of electronic component units in which the first and second internal electrodes are laminated with the ceramic layers therebetween are arranged side by side in the ceramic element assembly.

11. The laminated ceramic electronic component according to claim 10, wherein a plurality of pairs of the first and second external electrodes are provided so as to correspond to each of the plurality of the electronic component units.

12. The laminated ceramic electronic component according to claim 1, wherein each of the first and second extended portions has a constant or substantially constant thickness at all portions thereof.

13. A laminated ceramic electronic component, comprising:
a ceramic element assembly including a plurality of laminated ceramic layers including a first principal surface and a second principal surface that face each other and a plurality of side surfaces that connect the first principal surface and the second principal surface;
first internal electrodes located in parallel or substantially in parallel to the first and second principal surfaces in the ceramic element assembly; and
second internal electrodes arranged in the ceramic element assembly so as to partially overlap the first internal electrodes with the ceramic layers therebetween; wherein each of the first internal electrodes includes a first effective portion disposed in the ceramic element assembly, a first connecting portion connected to the first effective portion, and a first extended portion connected to the first connecting portion;
the first extended portion is exposed at a first side surface of the side surfaces of the ceramic element assembly and has a film thickness greater than that of the first connecting portion;
each of the second internal electrodes includes a second effective portion that overlaps the first effective portion through one of the ceramic layers, a second connecting portion connected to the second effective portion, and a second extended portion connected to the second connecting portion;
the second extended portion is exposed at a second side surface of the side surfaces of the ceramic element assembly and has a film thickness greater than that of the second connecting portion;
the laminated ceramic electronic component further comprises:
a first external electrode provided on the first side surface to which the first extended portions of the first internal electrodes are exposed; and
a second external electrode provided on the second side surface of the ceramic element assembly to which the second extended portions of the second internal electrodes are exposed; wherein
in the laminated ceramic electronic component, $G_2 > L_1$ and $G_1 > L_2$ is satisfied when a distance from the first side surface of the ceramic element assembly on which the first external electrode is provided to an inner end of each of the first extended portions is defined as $L_1$, a distance from the second side surface on which the second external electrode is provided to an inner end of each of the second extended portions is defined as $L_2$, a distance between the first side surface on which the first external electrode is provided and an end of each of the second internal electrodes is defined as $G_2$, and a distance between an end of each of the first internal electrodes and the second side surface on which the second external electrode is provided is defined as $G_1$; and
when a thickness of each of the ceramic layers is defined as c,
a thickness of each of the first connecting portions is defined as $e_1$,
a thickness of each of the second connecting portions is defined as $e_2$,
a thickness of each of the first extended portions is defined as $t_1$, and
a thickness of each of the second extended portion is defined as $t_2$,
$(G_1-L_2)^2 + \{c-(t_2-e_2)\}^2 \geq c^2$ and $(G_2-L_1)^2 + \{c-(t_1-e_1)\}^2 \geq c^2$ are satisfied.

14. A laminated ceramic electronic component, comprising:
a ceramic element assembly including a plurality of laminated ceramic layers including a first principal surface and a second principal surface that face each other and a plurality of side surfaces that connect the first principal surface and the second principal surface;
first internal electrodes located in parallel or substantially in parallel to the first and second principal surfaces in the ceramic element assembly; and
second internal electrodes arranged in the ceramic element assembly so as to partially overlap the first internal electrodes with the ceramic layers therebetween; wherein each of the first internal electrodes includes a first effective portion disposed in the ceramic element assembly, a first connecting portion connected to the first effective portion, and a first extended portion connected to the first connecting portion;

the first extended portion is exposed at a first side surface of the side surfaces of the ceramic element assembly and has a film thickness greater than that of the first connecting portion;

each of the second internal electrodes includes a second effective portion that overlaps the first effective portion through one of the ceramic layers, a second connecting portion connected to the second effective portion, and a second extended portion connected to the second connecting portion;

the second extended portion is exposed at a second side surface of the side surfaces of the ceramic element assembly and has a film thickness greater than that of the second connecting portion;

the laminated ceramic electronic component further comprises:
 a first external electrode provided on the first side surface to which the first extended portions of the first internal electrodes are exposed; and
 a second external electrode provided on the second side surface of the ceramic element assembly to which the second extended portions of the second internal electrodes are exposed; wherein in the laminated ceramic electronic component, $G_2 > L_1$ and $G_1 > L_2$ is satisfied when a distance from the first side surface of the ceramic element assembly on which the first external electrode is provided to an inner end of each of the first extended portions is defined as $L_1$, a distance from the second side surface on which the second external electrode is provided to an inner end of each of the second extended portions is defined as $L_2$, a distance between the first side surface on which the first external electrode is provided and an end of each of the second internal electrodes is defined as $G_2$, and a distance between an end of each of the first internal electrodes and the second side surface on which the second external electrode is provided is defined as $G_1$;

the first and second external electrodes include first and second plating films, respectively, provided on the first and second side surfaces of the ceramic element assembly;

the laminated ceramic electronic component further comprises:
 first and second surface conductors provided on at least one of the first and second principal surfaces at sides of the first side surface and the second side surface, respectively, of the ceramic element assembly; wherein the first plating film includes an extension portion extending to at least one of the first and second principal surfaces so as to cover the first surface conductor provided at the side of the first side surface;

the second plating film includes an extension portion extending to at least one of the first and second principal surfaces so as to cover the second surface conductor provided at the side of the second side surface; and the first surface conductor does not overlap the first extended portions in a lamination direction of the ceramic layer, and the second surface conductor does not overlap the second extended portions in the lamination direction.

* * * * *